W. J. ROBINSON.
COMBINATION MEASURING INSTRUMENT.
APPLICATION FILED AUG. 16, 1912.
1,083,376.                              Patented Jan. 6, 1914.
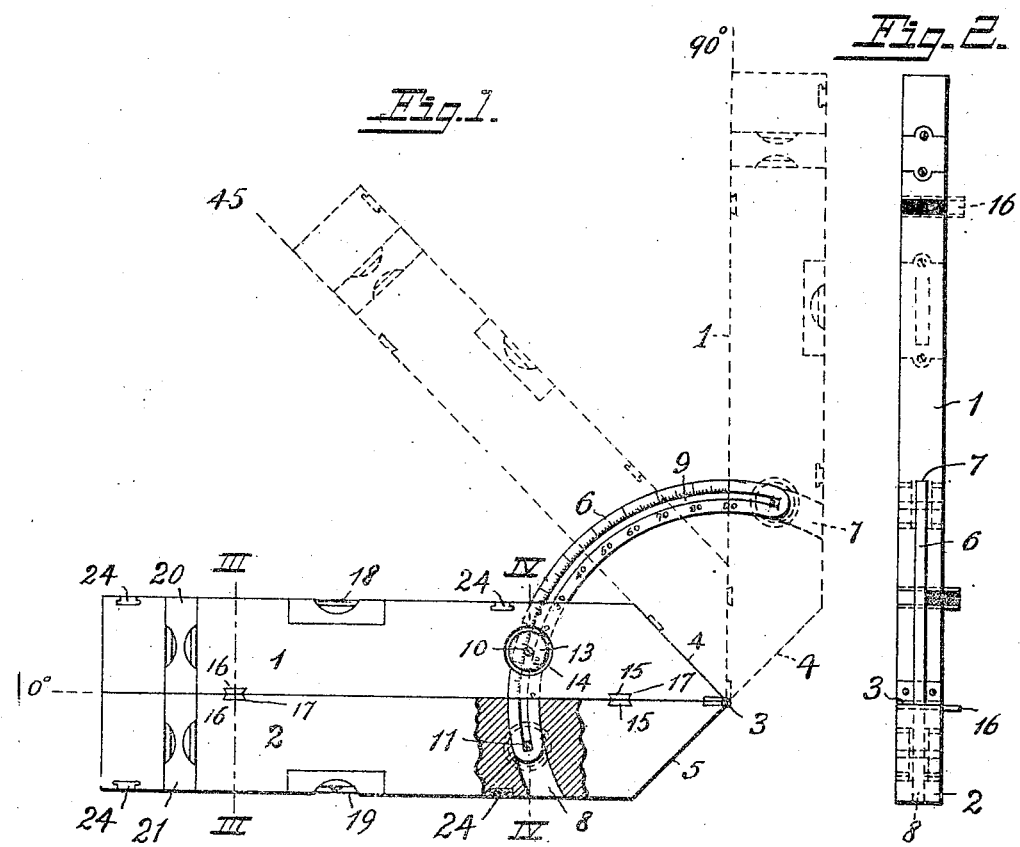
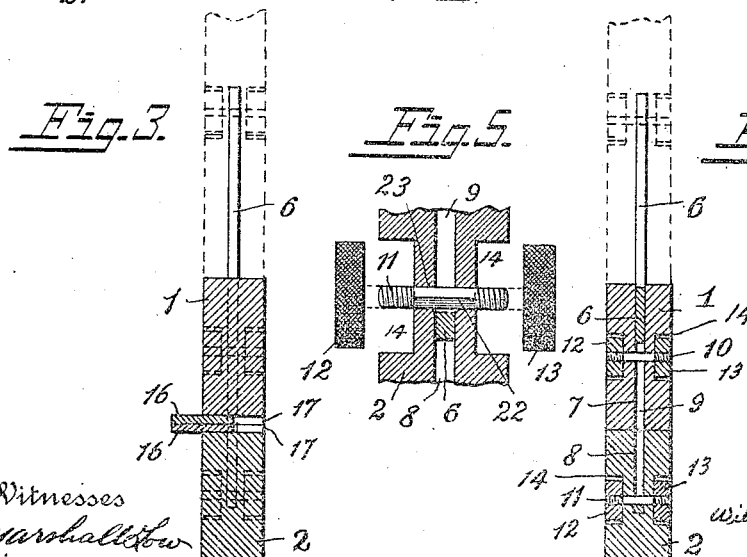
Witnesses
Marshall Low
Horace A. Lybrand
Inventor
William J. Robinson
by Frank B. Crosthwaite
Attorney

UNITED STATES PATENT OFFICE.

WILLIAM JOSEPH ROBINSON, OF HONOLULU, TERRITORY OF HAWAII.

COMBINATION MEASURING INSTRUMENT.

1,083,376.  Specification of Letters Patent.  Patented Jan. 6, 1914.

Application filed August 16, 1912. Serial No. 715,438.

*To all whom it may concern:*

Be it known that I, WILLIAM J. ROBINSON, a citizen of the United States, residing at Honolulu, Territory of Hawaii, have invented certain new and useful Improvements in Combination Measuring Instruments, of which the following is a specification.

The invention relates to combination tools, the principal function of which is the measurement of angles, levels and verticals. The invention has for its object the simplification of such an instrument, and the making of it more convenient, rapid and accurate in use, increasing the range of application of the instrument to various kinds of work, or structures to be measured, including structures to which it is sometimes difficult to apply this class of instrument conveniently or with accurate result.

With such object in view the invention consists in the parts and combinations thereof hereinafter more particularly set forth and claimed.

In order to make the invention more clearly understood I have shown in the accompanying drawings means for carrying the same into practical effect, without limiting my improvements, in their useful applications, to the particular construction which, for the purpose of example, I have illustrated.

Referring to such drawings:—Figure 1 is a side view of a combined instrument, comprising a bevel, level, plumb and square, embodying my improvements, different positions of one of the limbs of the same being shown in dotted lines. Fig. 2 is an end view of the same. Fig. 3 is a sectional view on line III—III of Fig. 1. Fig. 4 is a sectional view on line IV—IV of Fig. 1. Fig. 5 is a sectional view, enlarged, showing a portion of one of the limbs and the arc, and the clamping devices for the latter.

1 and 2 indicate the two limbs of the instrument which are hinged together by a suitable pivot 3. This pivot is located with its axis in the planes of two faces of each of the said limbs 1 and 2. At this point the inner face and the inclined end face 4 of the limb 1 meet at an angle of forty-five degrees, as do the inner face and the inclined end face 5 of the other limb 2 of the instrument. It results from this construction that when the instrument is closed, with the inner faces of the limbs in contact with each other, the said end faces 4 and 5 will be at an angle of ninety degrees to each other. Also, when the limbs 1 and 2 are at an angle of ninety degrees to each other, the end faces 4 and 5 will be in the same plane, said plane being at an angle of forty-five degrees to the inner faces of each of the said limbs 1 and 2.

6 is a protractor arc or scale arranged to engage both of the limbs 1 and 2 so that its center is coincident with the axis of the pivot 3, 7 and 8 are mortises formed in the parts 1 and 2, respectively, and located and shaped so as to be engaged by the arc 6 with a close fit, but free enough to allow of the ready adjustment of the limbs upon the arc to the desired angle. In order to enable the limbs to be clamped securely upon the arc the latter is preferably formed with a slot 9 in which fit set screws 10 and 11. The set screws pass through the limbs 1 and 2, respectively, and are provided at one end with a head or nut 12 and at the other end with a nut 13. Each side face of each limb of the instrument is formed with a recess 14, and in these recesses fit the heads and nuts of the set screws in such manner as to be flush with or so as not to project beyond the said side surfaces of the limbs. The nuts are preferably of sufficient size to enable them to be operated by the engagement of the fingers with their exposed surfaces, and the surfaces of the nuts may be slightly roughened to facilitate such operation. I prefer to make recesses 14 slightly larger than the nuts.

At two points on the inner edge of the limb 1 are mounted stop slides 15 and 16, which are fitted in recesses 17 so that the inner face of the slide shall be flush with the inner face of the limb. The recesses 17 may be slightly undercut or dove tailed to retain the slides within them but permit the stop slides to be moved out laterally so as to project from either face of the limb, as may be required for the application of the instrument to any construction which is to be measured and which cannot be engaged conveniently or at all by the edges of the limbs themselves. The stop slides fit with sufficient tightness in their recesses to be retained in place with both ends flush with the side surfaces of the limbs, excepting when the slides are pushed out for use.

18 is a level fixed in the outer edge of the limb 1, the plane of operation and indication of such level being parallel with said edge of the limb; and 19 is a similar level fixed in the outer edge of the limb 2. By the term level, as thus used, I mean a spirit level of known construction.

20 is a double spirit level fixed in the side of the limb 1 of the instrument, the plane of operation and indication of this double level being at right angles to the plane of indication of the level 18; and 21 is a similar double spirit level fixed in the side face of the limb 2. The levels 20 and 21 are thus operative when the limb carrying the level in question is vertical, whichever end of the limb is upward.

The arc 6 is marked with a scale of degrees from 0 to 90 on one side and is similarly marked upon its opposite side, excepting that the two scales run in opposite directions so that the instrument may be used conveniently in various positions, with either limb as a base and the other limb as an angle-measuring arm, as may be required. These scales are preferably graduated for single degrees, but may be more finely or less finely graduated. The arc is not necessarily limited to one of ninety degrees. It may be of greater or less curvature. I find it convenient, however, to make the slot 9 of such length that when both ends of the same are engaged by the screws 10 and 11 the instrument will thereby be set at an angle of ninety degrees, of one limb to the other.

The arrangement of the inclined faces 4 and 5 is such that they may be readily used for the measurement of angles greater than ninety degrees, and the angle measured by the inclination of the faces 4 and 5 to each other may be read from the scales on the arc 6 merely by adding ninety degrees to the reading of the scale. Thus, if the scale reads 5 degrees the angle measured by the inclination of the surfaces 4 and 5 will be ninety-five degrees, and so on.

The middle portion of the screws 10 and 11 may be squared at 22 and fitted in a corresponding squared mortise 23 in the limbs of the instrument, whereby the screws are kept from turning when the nuts are manipulated. Stop slides, for setting the outer edges of the limbs to the work, may also be provided on the outer faces of the limbs, as shown at 24.

What I claim is:—

1. In a combination measuring instrument, two limbs pivotally united at one edge of their end faces and recessed upon their opposite sides, a protractor arc having a slot and fitted in the said limbs and adapted to pass through the same between the said recesses, and set screws passing through the respective limbs and the slot of the said arc and having their heads and threaded portions fitted in the said recesses so as not to project beyond the surfaces of the limbs, substantially as specified.

2. In a combination measuring instrument, two limbs pivotally united at one edge of their end faces, a protractor arc extending from one limb to the other concentric with their pivot, for securing the said limbs adjustably relative to each other, a transverse slide fitted in the edge face of one of the said limbs, and a second transverse slide fitted in the same face of the same limb, both of the said slides being adapted to be projected for engagement with work which is to be measured and the straight line connecting the work-engaging faces of the two slides, and parallel with the said faces of said slides, being parallel with the said limb, substantially as specified.

3. In a combination measuring instrument, two limbs pivotally united at one edge of their end faces and having the end face of each limb in the same plane with the axis of the uniting pivot, the said end faces forming a salient angle when the two limbs are folded parallel with each other, and being in a common plane when the two limbs are at right angles to each other, a protractor arc extending from one limb to the other, concentric with the said pivot, and means for securing the limbs to the said arc, substantially as specified.

In testimony whereof I affix my signature in presence of two witnesses.

WILLIAM JOSEPH ROBINSON.

Witnesses:
M. T. SIMONTON,
JOHN MARCALLING.